United States Patent
Koski et al.

(10) Patent No.: US 10,163,065 B1
(45) Date of Patent: Dec. 25, 2018

(54) SYSTEMS AND METHODS OF ENSURING AND MAINTAINING EQUIPMENT VIABILITY FOR A TASK

(71) Applicant: nMetric, LLC, Santa Ana, CA (US)

(72) Inventors: Christine Koski, Dallas, TX (US); Ryan Heaton, Castle Rock, CO (US)

(73) Assignee: NMETRIC, LLC, Costa Mesa, CA (US)

(*) Notice: Subject to any disclaimer, the term of this patent is extended or adjusted under 35 U.S.C. 154(b) by 0 days.

(21) Appl. No.: 15/679,039

(22) Filed: Aug. 16, 2017

(51) Int. Cl.
G06Q 10/06 (2012.01)
G06Q 10/10 (2012.01)
G06F 9/48 (2006.01)

(52) U.S. Cl.
CPC . G06Q 10/063112 (2013.01); G06Q 10/1097 (2013.01); G06F 9/4806 (2013.01); G06Q 10/06316 (2013.01); G06Q 10/063114 (2013.01)

(58) Field of Classification Search
None
See application file for complete search history.

(56) References Cited

U.S. PATENT DOCUMENTS

| | | | | |
|---|---|---|---|---|
| 5,673,034 A | * | 9/1997 | Saliga | G06Q 20/085 235/382 |
| 6,157,916 A | * | 12/2000 | Hoffman | G06Q 10/0631 702/182 |
| 7,587,329 B2 | | 9/2009 | Thompson et al. | |
| 2009/0315753 A1 | | 12/2009 | Bhavani et al. | |
| 2013/0031614 A1 | * | 1/2013 | Cossard | G06F 21/31 726/4 |
| 2013/0339969 A1 | | 12/2013 | Koski et al. | |

OTHER PUBLICATIONS

Published Feb. 19, 2016, https://web.archive.org/web/20160219193348/http://www.nmetric.com:80/discrete-manufacturing/.*
Published Feb. 19, 2016, https://web.archive.org/web/20160219225112/http://www.nmetric.com:80/discrete-manufacturing/how-nmetric-works/.*
Published Dec. 31, 2014, https://web.archive.org/web/20141231000947/http://www.nmetric.com:80/knowledge-library/brochures-indepth.*
Lau, Henry.Integrated scheduling of handling equipment at automated container terminals. May 25, 2007.Science Direct pp. 665-682 (Year: 2007).*
Siler, Hugh. SentriLock Announces Leap Forward with Realtor(R) Lockbox NXT Wireless Lockbox System. Nov. 11, 2009. Business Wire (Year: 2009).*

* cited by examiner

*Primary Examiner* — Timothy Padot
*Assistant Examiner* — Arif Ullah
(74) *Attorney, Agent, or Firm* — Fish IP Law, LLP

(57) ABSTRACT

A device management system that is capable of scheduling connected devices and personnel for tasks, monitoring the ability of the devices to perform the scheduled task by checking in with the devices based on their uses and locations, and to modify the functioning of the devices according to the tasks scheduled for the devices and their uses. Additionally, the system can incorporate uncommunicated "dumb" devices into the scheduling of tasks and track and manage those devices.

12 Claims, 5 Drawing Sheets

SYSTEMS AND METHODS OF ENSURING AND MAINTAINING EQUIPMENT VIABILITY FOR A TASK

FIELD OF THE INVENTION

The field of the invention is device operations management in a schedule of tasks involving devices.

BACKGROUND

The background description includes information that may be useful in understanding the present invention. It is not an admission that any of the information provided herein is prior art or relevant to the presently claimed invention, or that any publication specifically or implicitly referenced is prior art.

When a company has a series of tasks that need to be completed, a manager typically allocates employees towards each task. Computer scheduling systems, for example Microsoft Outlook®, can be helpful to visualize such schedules. For example, a manager could use a computer scheduling system to block off specific times of the day for employees to perform certain tasks, and assign specific employees to that task. Each employee would then have a calendar of tasks to do throughout each day, week, and month, which could be easily visualized and organized. In order for a manager to assign specific employees to each task, however, the manager needs to manually track each employee's schedule and allocate each employee to the appropriate task.

US 2009/0315735 to Bhavani teaches a computer system for managing patient flow in a hospital, where a manager could tag specific patients, medical employees, and resources with RFID chips to determine where each patient, employee, and resource is, and allocate each resource accordingly as needed. For example, if there are too many patients waiting for an examination room, a patient could be automatically relocated to an examination room with a shorter line by sending a message to an available employee to redirect that patient. Bhavani, however, requires the system to manually track each patient, employee, and resource by a unique identifier.

U.S. Pat. No. 7,587,329 to Thompson teaches a computer system for managing a health clinic, where a manager could input a series of attributes into a computer that an on-duty nurse needs to have to accomplish a specific task. The system then matches available nurses with those requirements with the task in order to accomplish the task, and can send out schedules to each nurse, letting that nurse know what tasks to perform.

Additionally, these systems and other prior-art systems fail to continue to ensure a device viability for a scheduled task as the schedule develops and manage the functions of the devices such that the devices are capable of use for the scheduled tasks with changing schedules. The prior-art systems similarly fail to provide for the seamless inclusion of devices having processing and communications capabilities with legacy or other 'dumb' devices that have no such capacity.

Bhavani, Thompson, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is a need for a scheduling system that provide simultaneous management of functions of connected devices for scheduled tasks including adjustments of output and functionality for those connected development, optimized exception resolution for these devices, and for the incorporation of non-connected "dumb" devices into an online scheduling system within a facility.

SUMMARY OF THE INVENTION

The inventive subject matter provides apparatus, systems and methods in which a machine, device or piece of equipment can be scheduled for a task, and the readiness of a machine, device, or piece of equipment schedule for a particular scheduled task can be monitored, such that if the device/machine is no longer suitable for the task, a replacement can be found so that the task can be carried on.

In various embodiments of the inventive subject matter, a computer receives a request to schedule a task, the request including task attributes with corresponding values that are associated with the task. The request includes a desired time period attribute/value pair that corresponds to the desired date/time of the task. The request can also include a location attribute, corresponding to the desired location for the task. The computer selects at least one device based on the task attribute/value pairs, including the desired time period attribute/value and corresponding device attribute/value pairs of the device, and at least one person for the task based on the task attribute/value pairs including the desired time period/attribute value and corresponding personnel attribute/value pairs among a plurality of people. At a designated check-in time after scheduling the task, the computer obtains sufficiency information regarding the selected device, and determines a sufficiency status for the device for the scheduled task as a positive or negative sufficiency status. If the computer determines a positive sufficiency status, it sends instructions to the device to allow execution of the device for the task at the given task time. In various embodiments, the person(s) selected for the task are notified upon the scheduling of the task of the time, location, and any other relevant details.

In various embodiments, at the check-in time, the computer can also verify that the at least one person is available for the task by sending a message to a device associated with the person.

In various embodiments, the computer can select backup devices also suitable for the requested task, and based on factors such as the number of available backup devices, their respective anticipated locations, and other factors, can adjust the check-in time for the device selected for the task accordingly by increasing the time between the check-in time and the start of the scheduled task.

In various embodiments, if the computer determines that a device has a negative sufficiency status, the computer proceeds to select a backup device for the task, which can be at the time of a failed check in (i.e., returning negative sufficiency status), or can be a backup among a group of preselected backups at the time of the scheduling of the task.

In various embodiments, the computer selects an alternate time for the task based on a determined negative sufficiency status for the device, such that the alternate time is one where the sufficiency status would be positive.

In various embodiments, the devices and computer communicate directly via data communications between the computer and devices and vice-versa (via a communication between a device and computer with or without intermediary relay devices). In various embodiments, the computer can also check-in with devices lacking communication and processing capabilities via a proxy, by locating and communicating with computing devices at the locations of the dumb devices to confirm their presence.

In various embodiments, the computer can send messages that cause the devices to change their functionality by restricting their modes of operation such as working at less than full capacity or outputting less than the total available output during a task, based on a scheduled task requirement and the requirements of subsequently-occurring but previously-scheduled tasks.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain various embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain various embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Figure 1:
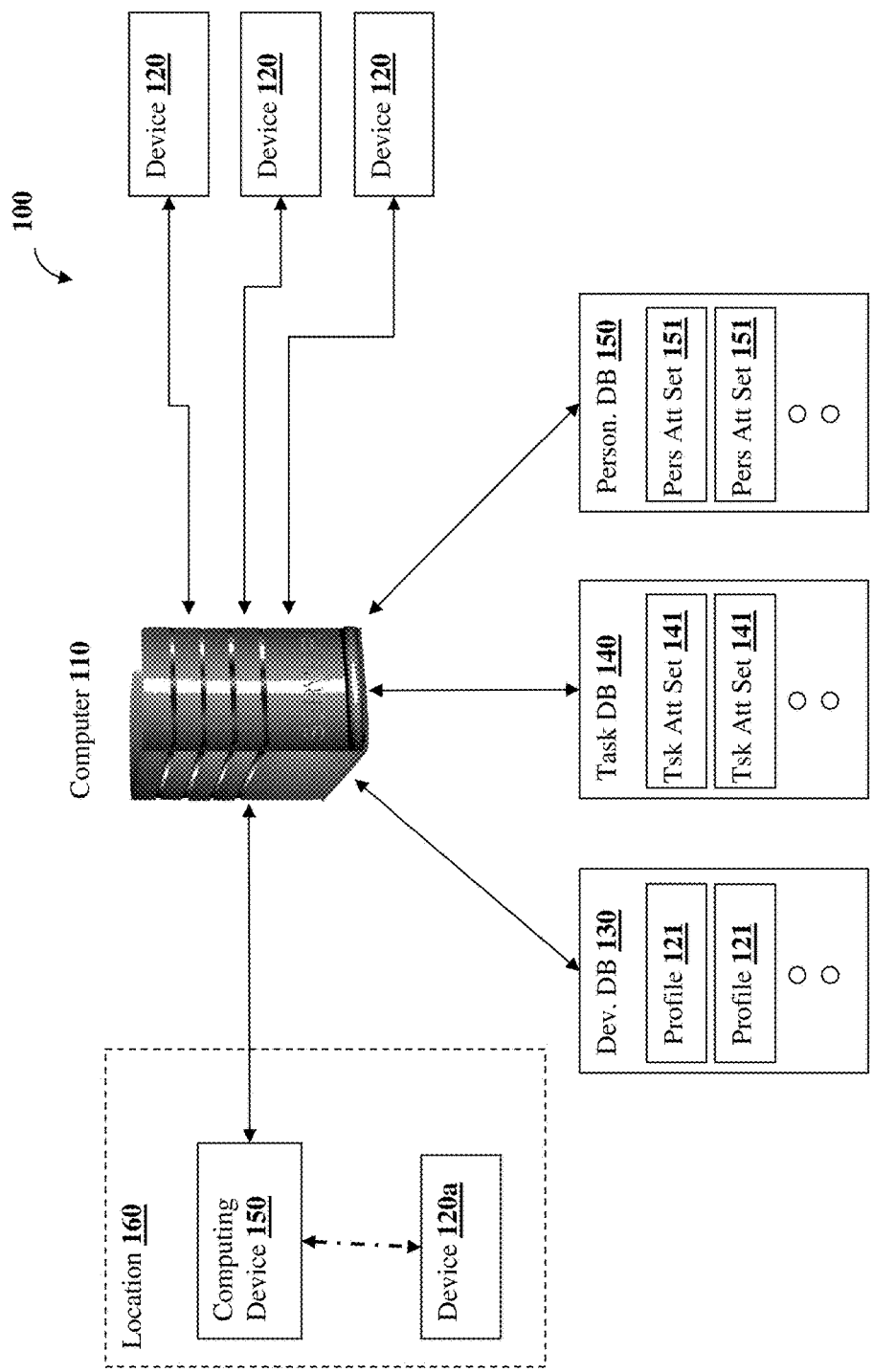
FIG. 1 is a diagrammatic overview of the system according to embodiments of the inventive subject matter.

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One should appreciate that the disclosed techniques provide many advantageous effects, including facilitating the scheduling events and ensuring that the events are able to be carried out with the machines or equipment as scheduled.

Throughout this description, references will be made to "attributes" of various types (e.g., device attributes, task attributes, personnel attributes, etc.). Mentions of "attributes" refer to data representations in the form of attribute name/value pairs, such that the mention of an "attribute" includes both an attribute name and a corresponding value. Similarly, when necessary to address a particular attribute name or the associated attribute value of an attribute individually, a corresponding reference will be made to avoid confusion. As will be appreciated by the astute reader, some attributes can comprise a single attribute name/value pairing while other attributes can include multiple value entries for a single attribute name.

FIG. 1 provides a diagrammatic overview of a system 100 according to embodiments of the inventive subject matter. The system 100 includes one or more computers 110 (e.g., one or more central servers). For simplicity, central computer(s) 110 will be referred to herein as a single computer 110. However, it is understood that the functions and processes of computer 110 can be performed by and/or distributed among more than one computer 110 distributed locally over a local data connection interface or distributed over longer distances via long distance connection interfaces. The computer 110 can be located in the same facility or location as one or more of the other components of system 100, or remotely in separate locations.

Devices 120 generally are a plurality of devices that are can be used in furtherance of completing various tasks at a location where system 100 is employed. Devices 120 thus can include equipment such as computing devices, general tools, specialized tools, environmental controls, etc. In a hospital setting used as an illustrative example herein, devices 120 can include medical scanning/diagnostic equipment, patient monitoring equipment, surgical tools, patient beds, patient wheelchairs, computer equipment, anesthesia equipment, room environmental controls, specialized medical devices, and other devices typically used by personnel (e.g., doctors, nurses, specialists, etc.) to carry out the various patient care procedures typically performed in a hospital. As used herein, "device" and "machine" are used interchangeably.

As seen in FIG. 1, the computer 110 is communicatively connected to a plurality of devices 120. The communication between computer 110 and the various devices 120 can be via a data communication for those devices so equipped to do so.

System 100 includes a device database 130 that stores a device profile 121 for a plurality of devices 120. The device profile 121 of each device 120 includes a plurality device attributes corresponding to attributes or characteristics of the device. Preferably, the device attributes for each device 120 include at least those that correspond to the ability of a device to perform its intended function. Examples of device attributes include a device power state, a device supply state, a device location, a device condition, a device maintenance state, a device category, a device manufacturer, a device resupply schedule, a device model number, device permissions, a device network state, etc. The collection of attributes for a particular device can be considered to be the device profile corresponding to the device. As will be appreciated by the astute reader, not all device attributes will necessarily apply to all devices.

Devices 120 can be indexed in the device database 130 according to a device identifier for each device. The device identifier can be generated and assigned by the system upon the creation of a database for the device. The device identifier can be generated randomly, and/or based on one or more of a category of device, a manufacturer, a model number, an individual serial number, a network address, a sequential number based on the amount of other identical devices present/owned by a facility or entity, etc.

The device database 130 can also include, in the device profile 121 of each device 120, device schedule data for the device 120 that includes entries for already-scheduled tasks or other scheduling conflicts (e.g., scheduled downtime for maintenance/repair, updates, recertification, resupply, etc.) for the particular device. The schedule can be in table form, in calendar form, etc. with scheduled time/date entries for each the previously-scheduled tasks/conflicts.

Figure 4:
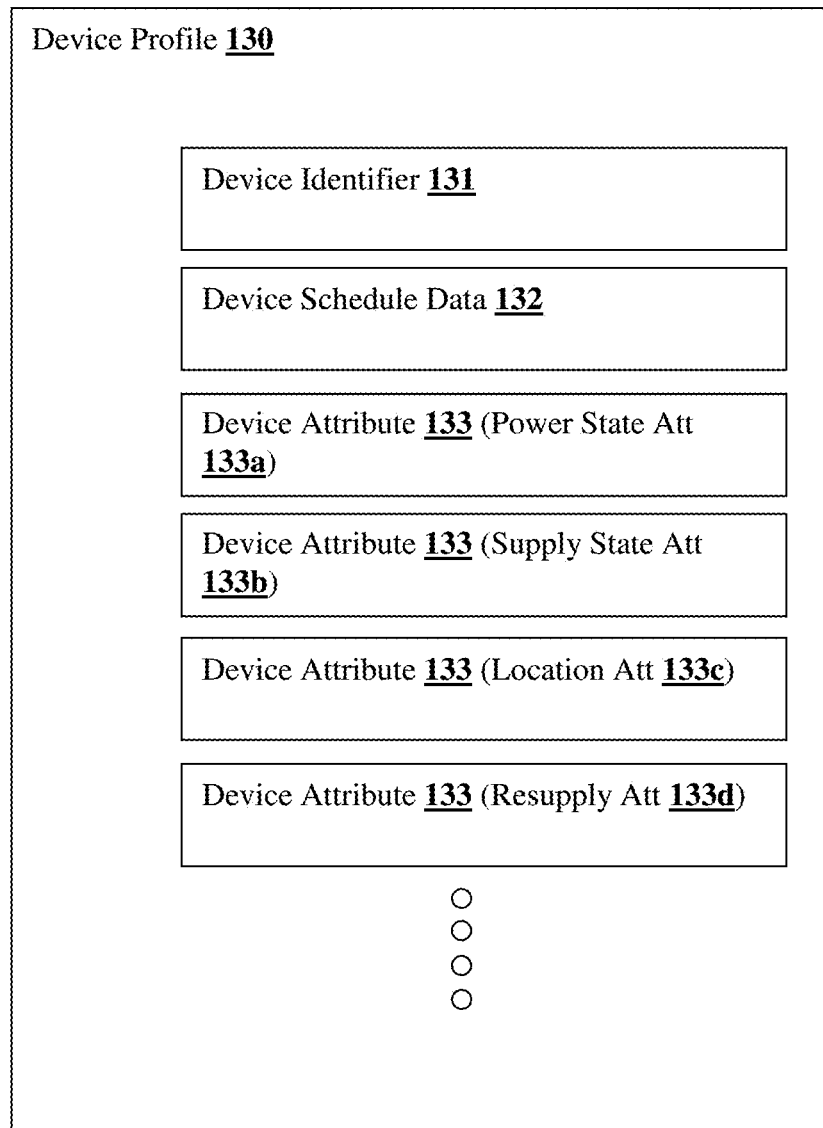
FIG. 4 provides an illustrative example of a device profile, according to embodiments of the inventive subject matter.

FIG. 4 provides an illustrative example of a device profile 121.

In various embodiments, the scheduling data for each device 120 can be kept in a central scheduling or calendaring program for all devices 120 (in addition to or instead of the schedule table or other schedule data kept for each device 120 in device database 130), whereby entries for each individual device can be referenced according to an identifier associated with the device (e.g., device database identifier, manufacturer/model/serial identifier, network identifier, etc.). Thus, in these embodiments, the system consults the central scheduling program via the device identifier when requiring information about a particular device's availability and/or schedule in accordance with various functions and processes associated with the inventive subject matter.

The device power state attribute corresponds to the amount of power or charge available for a battery-operated device 120. Thus, the power state attribute value corresponds to a battery level or charge level of the device's battery.

The device supply state attribute corresponds to the amount of a finite resource dispensed or used by a device 120 that is currently accessible to the device. For example, for a tank of anesthesia, the device supply attribute state value corresponds to the amount of gas within the tank.

The device power state attribute and the device supply state attribute can be referred to as resource state attributes of a device 120. The resource state attributes are those attributes that reflect a quantified characteristic or parameter of a device 120 that depletes with use, such as a quantity of a supply associated with the device. Thus, the device power state attribute and device supply state attributes are examples of resource state attributes.

The device location attribute corresponds to the last reported location of the device. The location can be within a particular structure or area (e.g., within a hospital or on hospital grounds including areas outside the hospital building itself).

The device profile of some devices, such as battery-operated devices or devices that store and/or dispensing a resource used in certain tasks, can include one or more device resupply attribute(s) correspond to a scheduled recharge or resupply of the device. For example, for a battery-operated device, there may be a periodic, pre-scheduled time for recharge (e.g., every day, weekly, etc.).

The device condition attribute corresponds to a current device condition, such as due to wear and tear, usage, etc.

The device maintenance state attribute indicates whether a device requires maintenance. This can be due to a reported malfunction, or a pre-defined or periodic maintenance schedule (e.g., required diagnostic or calibration of particular device, etc.). In various embodiments, the device maintenance state attribute value can be a future date or event of maintenance (e.g. hours of use, scheduled date, etc.).

The device permissions attribute corresponds to a role, certification or other special authorization required by a user to operate the device. This may be due to specialized manufacturer training, legal requirements, etc. In certain various embodiments, the device permissions attributes can include one or more entries of specific personnel that are authorized to or certified to operate the device.

The device network state attribute corresponds to the network capabilities of the particular device. Certain devices may have the ability to network with the computer 110 to exchange information (e.g. report conditions, receive commands). The networking ability may be direct (e.g., over a Wifi or wired network connection, cellular, etc.) or indirect (e.g. via a short-range protocol such as Bluetooth or NFC via a bridge or other intermediate relay device) while others may not have the ability to network directly but may still be tracked via an attached RFID component.

The system 100 includes a task database 140 storing a plurality of task attribute sets 141, each of the task attribute sets comprising a set of task attributes associated with a particular task. The task attributes are representative of various characteristics associated with a task. Examples of task attributes include a task name, a task identifier, a task duration, required task devices, required task personnel, and required task facilities.

The required task devices attributes can include a device category, class, or name corresponding to the category, class, or name of the particular device needed for the task. Other task device attributes can include attributes associated with the characteristics of the devices themselves such as those that distinguish a particular device from others used for similar purposes. This can include attributes associated with device dimensions, power requirements, device interface type, device hardware configurations (e.g., a drill with a certain bit size or shape), etc.

For certain devices represented by a corresponding required task device attributes, the task attribute sets also include one or more device minimum readiness attributes. The values of the device minimum readiness attributes can be considered to represent the minimum thresholds of one or more characteristics of a device of suitability for the task. In other words, in order for the device to be successfully used as required for the particular task, the corresponding device attributes of a device must meet or exceed the minimum readiness attributes of the task. For example, for a task having a particular duration that requires a battery-powered device, a minimum readiness attribute would be a task duration attribute (or subtask duration attribute, if present and applicable, for the subtask to which the device is specifically used) indicating a minimum amount of operating time that the device must be able to perform in order to be suitable for the task. This can also be expressed in terms of a percentage of a particular attribute reflective of a capacity or amount of a resource associated with a device (e.g., percentage of battery charge, percentage of amount of material contained in the device, etc.).

The system 100 also includes a personnel database 150 including a plurality of personnel attribute sets 151, each comprising a set of personnel attribute/value pairs associated with an individual person. Examples of personnel attributes include a name, role, specialization(s), certification(s), location, etc. As with the device database 130, the personnel database 150 can similarly include a schedule for each person in the personnel database that includes entries for already-scheduled tasks or other scheduling conflicts (e.g., delineation of a workday or time "on duty", scheduled vacation time, etc.) for the particular person. The schedule can be in table form, in calendar form, etc. with scheduled time/date entries for each the previously-scheduled tasks/conflicts.

In the embodiments where a central calendaring system is used, the central calendaring system can similarly store the scheduling information for each person from the personnel database indexed according to a person's name or other personnel identifier.

Figure 2:
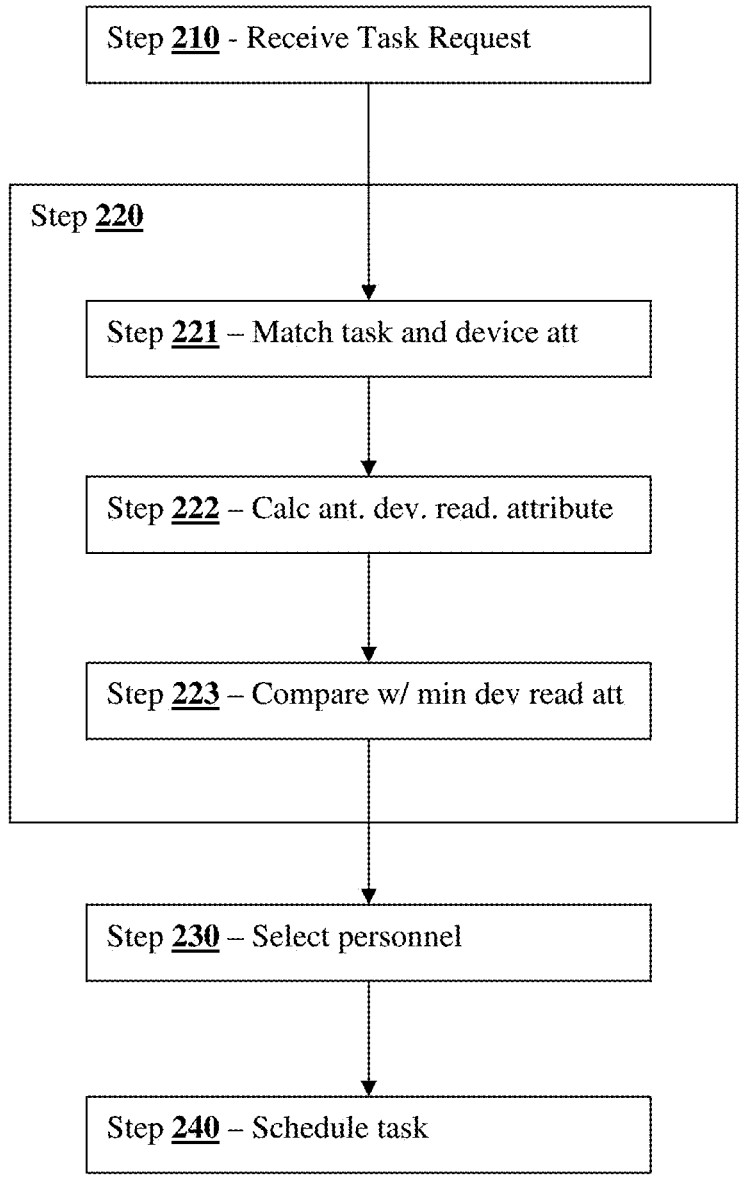
FIG. 2 provides an illustrative flowchart overview of the initial task process executed by the computer, according to embodiments of the inventive subject matter.

FIG. 2 provides an overview of the initial task scheduling carried out by the computer 110.

At step 210, the computer 110 receives a request to schedule a particular task. The request includes task attributes including at least an identification of a task name or category and a desired time period attribute (e.g., indicating a date/time) for the task. The request typically also includes a desired location attribute (e.g., indicating a location for the task such as a particular room and other relevant location information) and can also include other task attributes selected or entered by the requesting user.

Based on the request, the computer 110 proceeds to select one or more device(s) related to the task at step 220 based on a match of a plurality of the task attributes (including the desired time period attribute for the task selected by the user and the task duration associated with the task) with the device attributes of the devices 120 (and the device schedule table and/or schedule of the device in the central calendar/scheduling program) and, optionally, one or more calculated anticipated device readiness attribute values of the device for the task. The selection of the device(s) 120 for the task at step 220 is as follows:

At step 221, the computer 110 matches task attributes with corresponding device attributes of the device profiles of the devices 120, such as the device type, category or class in the task attribute with devices having the matching type, category, or class device attribute and the desired time period attribute for the task with the corresponding calendars or time tables.

If the anticipated device attribute values are used, at step 222 the computer 110 calculates the anticipated device readiness attributes for each of the devices selected at step 221 and compares it to the corresponding minimum device readiness attributes at step 223.

The computer 110 calculates the anticipated device readiness attribute values for each of the devices at step 222 by, for each of the device attributes that correspond to device minimum readiness attributes of the task, calculating the anticipated values of those device attributes based on the current values of those device attributes and the already scheduled tasks and, as applicable, other scheduled events (e.g., maintenance, regular resupply or recharge, etc.) in the calendar for the device 120 (such as the schedule for the device in device database 130) between the current time and the desired time period.

Thus, for a given device 120, the computer 110 begins with the current values of the device attributes corresponding to the device minimum readiness attributes of the task and, for each previously-scheduled task and conflict/event sequentially, chronologically starting from the present and determines an expected change for the attribute value based on the attributes of the scheduled task. The current values of these device attributes can be those stored and regularly updated in the device's profile and/or the computer 110 can communicate with the device 120 and request a current status for the pertinent device attributes. The device 120 then communicates the current values to the computer 110.

In various embodiments, the scheduled tasks will include, for each device scheduled for the task, expected use values for the device attributes that are to be affected by the performance of the task. These values can be based on the historical usage of the device for the task (e.g., determined by analysis of many uses over time and then via statistical analysis of likely use for the task), or can be entered manually by the requestor of that task. For example, if a certain device dispenses a certain material for use in a procedure and, for the scheduled task, it is anticipated that a particular amount of the material will be necessary, the expected use value for the material is the amount expected to be necessary for the task. Thus, the computer 110 adjusts the device supply state attribute for the device 120 by subtracting the expected use value for the task.

For certain device attributes, the computer 110 can determine an expected use value based on an a priori known correlation of a device attribute and one or more task attributes of the scheduled task. For example, if a scheduled task is expected to use a battery-operated device for a certain amount of time based on the task duration, and the device attributes include a rate of consumption of the battery power for the device, the computer 110 calculates an amount of anticipated battery power use for the pre-scheduled by multiplying the task duration times the rate of consumption. This anticipated battery power use is the expected use value used to adjust the power state attribute of the battery-powered device for the pre-scheduled task. The computer 110 then adjusts the power state attribute by reducing its value by the calculated expected use value.

For events such as scheduled resupply and recharge times scheduled for a particular device (and also for scheduled maintenance times), the computer 110 similarly increases the values of the respective device attributes as anticipated. If the scheduled resupplies/recharges are expected to fully resupply/recharge the device (such by a full resupply or by a swap of a battery from depleted to fully charged, material tank or receptacle from empty to a full one, etc.), the corresponding device attribute values are set to the full values. For gradual resupply/recharge tasks (such as a battery recharge while plugged in), the computer 110 calculates the appropriate change to the device attribute value based on an a priori known rate of resupply/recharge and the time allocated to the resupply/recharge task.

Thus, the computer 110 takes the adjusted device attribute value output from a previously-scheduled task and then calculates and applies the next adjustment for the next task in chronological order as described above until all of the tasks and other scheduled events for the device 120 are processed and the device attribute values adjusted to account for all of the scheduled tasks and events scheduled prior to the requested desired time period of the desired time period attribute of the task. These final adjusted device attribute values are the anticipated device readiness attribute values for the device attributes that correspond to the device minimum readiness attributes.

It should be noted that the device attribute values used adjusted by the computer 110 during the process of step 222 are stored and changed by computer 110 for the purposes of scheduling the task separately from the device profile in device database 130. In other words, the current values of the device attributes stored by device database 130 that reflect the actual current values are not adjusted.

At step 223, the computer 110 compares the anticipated device readiness attribute values to the values of the device minimum readiness attributes. If the anticipated device readiness attribute values meet or exceed the device minimum readiness attribute values (for some attributes, meeting or exceeding the device minimum readiness attribute values means a value that is greater or equal to that of the device minimum readiness attribute value; for others, it may mean a value that is less-than or equal to, if a lower device attribute value is used to indicate an increased readiness or "preparedness" of the device), the computer 110 schedules the device 120 to the task at the desired location at the desired time/date indicated in desired time period attribute of the request.

In various embodiments, the computer 110 is also programmed to, at step 223, determine the availability of the device 120 that is selected in step 222 based on the last-scheduled location and the scheduled end-time the last previously-scheduled task of the device prior to the desired date/time in the desired time period attribute and the desired location in the desired location attribute in the request. Based on an expected time to travel from the location of the last-scheduled task and the desired location (such as based on a priori set transition times between various points in a building such as a hospital, an analysis of historical data involved with moving the particular device across particular distances, etc., and can involve accounting for expected time adjustments for travelling between floor such as in an elevator, based on average walking speed, and/or other factors), the computer 110 determines whether there is sufficient time for the device 120 to be taken from the last-scheduled task to the desired location in time for the start time of the task in the request as indicated by the desired time period attribute. This calculation can include buffers of time to account for prep or setup time for the device 120, for delays or over-runs in the previous task, time to disconnect or "set-down" the device in the prior task, etc. If the computer 110 determines that the device 120 will be able to be moved to the desired location for the requested task, the computer 110 schedules the device 120 for the desired task.

In various embodiments, for one or more selected devices 120, the calculated anticipated device readiness attribute values can be stored with the scheduled task entry in the task calendar and/or the schedule maintained in device database 130 for the device.

If the process of steps 222-223 fails for a particular device 120, the computer 110 is programmed to proceed to the next device of the same type and re-run the analysis until a suitable device is located. If the computer 110 goes through all of the devices of a particular type required by the requested task without finding a match, it reports this to the requesting user. In various embodiments, the computer 110 can re-run the analysis of step 220 for other times, such as starting with other available times closest to the desired time period in the desired time period attributes that would fit the duration for the task and, when a match is found for all of the necessary devices 120, suggest the alternative time to the requesting user.

At step 230, the computer 110 selects one or more personnel based on a matching between the plurality of the task attributes (including the desired time period attribute) and the personnel attributes (including the schedule data for each person in the personnel database).

In this illustrative process, step 230 is shown as occurring after step 220. However, it is contemplated that step 230 can be performed by computer 110 prior to step 220.

In the illustrative process where step 230 occurs after step 220, the computer 110 also selects one or more personnel at step 230 based on the selected device(s) at step 220. For example, if a certain device selected at step 220 requires an operator of a particular certification/role/having certain credentials that allow them to operate the device, then the computer 110 selects the operator is selected at step 230 from those having the certification/role/credentials values in the corresponding attributes in their personnel attribute sets to operate the device. In other embodiments, the step 230 can be performed before step 220. As with step 220, if a failure to find personnel is determined at step 230, the computer 110 is programmed to alert the requesting user. In various embodiments, the computer 110 re-runs the processes of steps 220 and 230 using other possible time periods and, upon finding one or more times where the processes of steps 220 and 230 are executed with successful matches of devices and corresponding personnel, the computer 110 presents the suggested on or more alternative times to the requesting user.

In various embodiments, the computer 110 is programmed to determine the order in which to perform steps 220 and 230 based on a total amount of devices 120 in the device database that fit a particular required task device attribute for a task and a total amount of personnel in the personnel database for one or more of those devices such that the limiting factor of the devices versus personnel is prioritized first. For example, if, for a particular device required for a task, there are X amount of devices and Y amount of personnel that operate the devices, then if X less than (or less than or equal to) Y, the computer 110 is programmed to perform step 220 first because there are less available devices than personnel, so finding suitable devices for the requested task is likely to be more difficult even without accounting for the actual scheduling. Conversely, if X is greater or equal to (or, only greater than) Y, the computer 110 is programmed to perform step 230 first because the personnel is likely to be more difficult to schedule than the device and because it is likely that if there is an available personnel, then there is likely to also be an available device (since non-authorized personnel are not expected to be using the devices, the authorized personnel should be the only ones taking up the supply of devices, not accounting for devices down for maintenance, etc.).

A task may have certain elements required that are absolutely essential to the task, without which the task may be impossible to perform. Thus, for a particular task, certain task attributes (and/or certain task attribute values) may be designated as "essential" within the task attribute set. For example, for a medical procedure requiring a particular specialist that is rare and thus difficult to schedule (e.g., brain surgery requiring a brain surgeon), the personnel attribute having a value corresponding to the specialist is marked as essential. Similarly, for a particular procedure that requires a very specific, relatively rare, device (e.g., a particular scanning device, very specialized surgical tool, etc.) the device attribute having a value corresponding to this device can be marked as essential. In these embodiments, the computer 110 will perform the matching for the essential task attributes first before performing the more "general" selection of devices at step 220 and personnel at step 230. In various embodiments, the essential task attributes can be ranked for a particular task such that the computer 110 matches the essential attributes in the ranking order.

At step 240, once all of the devices and personnel have been selected for the task at the desired task time (or alternative task time, if necessary), the computer 110 schedules the task in a scheduling or calendaring program (which can be the same as the one discussed with respect to certain various embodiments of the device and personnel attribute sets, or a separate scheduling/calendaring program), and updates the device and personnel information to block off the scheduled task at the appropriate time. The "block" can also include additional time prior to and after the scheduled task to allow for travel times and to provide a general buffer against potential scheduling conflicts. The computer 110 can also provide a notification to the personnel scheduled for the task including the task time, location, and other relevant details.

Additionally, In various embodiments, the computer 110 sends a confirmation message to the device 120. The confirmation message can include an authorization of use for the time of the task, starting at the start time of the task (or at a pre-set period prior to the task to allow for setup and device initialization, as necessary). The authorization of use can include login credentials for the task to the device and executable instructions that cause the device to lock or otherwise be inaccessible for the period during the task if the login credentials are not used.

In various embodiments, the confirmation message can also include use restrictions such as restricting device function(s) to a certain percentage of use, to a specific amount of time, to a specific level of capability (e.g., certain level of power output or intensity to limit battery usage, etc.) to a specific amount of supply dispensed, etc. In these embodiments, the use restrictions are executable instructions by the device 120 that then cause the device 120 to operate according to the use restrictions. The use restrictions for a particular confirmation message are set by computer 110 such that the parameters of use of the device 120 still comply with the requirements of the task associated with the confirmation message containing the use restrictions. For example, if a particular device is able to perform a function of a task at 70% output, but 100% is desirable because it would complete the task faster, the use restriction will restrict the output to 70% (or other value less than 100%) such that it will be the maximum output during the task.

In various embodiments, the confirmation message can include the minimum device readiness attributes for the task, which are stored by the device 120. In these embodiments, the device 120 is programmed to monitor its various device attributes for the task and compare them against one or more stored confirmation messages and, if certain device attributes change during use such that a minimum device readiness attribute of a confirmation message for a subsequently-occurring task is no longer met, the device 120 communicates the condition to the computer 110.

The scheduled task can also include expected use attributes with corresponding values for certain device attributes of the various devices, indicating the expected use of a particular resource or supply of a device for the execution of the scheduled task. These values can be used by the computer 110 in the subsequent scheduling of tasks as discussed above.

In various embodiments, the computer 110 can be programmed to detect exceptions such that a scheduled task cannot make a previously-scheduled but subsequently occurring task impossible to complete. As noted above, the calculated anticipated device readiness attribute values for one or more devices for a particular task are stored. Thus, the computer 110 adjusts one or more anticipated device readiness attribute values for one or more of the previously-scheduled, subsequently-occurring tasks based on the expected use attribute values of the task scheduled at step 240 and compares the adjusted anticipated device readiness attribute values for the subsequently-occurring tasks against their respective minimum readiness attribute values. If the result of the comparison is such that the adjusted anticipated device readiness attribute values still meet or exceed the minimum readiness attribute values, then there is no conflict and the task scheduled at step 240 remains in the schedule. If the adjustment causes the adjusted anticipated device readiness attribute values to no longer meet respective minimum readiness attribute values, the computer 110 indicates a conflict to the user submitting the current task received at step 210, and removes the scheduled task from the calendar (or, In various embodiments, performs this after step 220 and indicates a failure to schedule). As with a failure to schedule at step 220, the computer 110 can run an analysis for alternative date/times for the requested task such that no conflicts are found for previously-scheduled tasks and suggest those to the user.

In a variation of these embodiments, certain pre-scheduled tasks can be marked as "essential" or otherwise prioritized (such as according to a particular personnel scheduled for the task, a particular device scheduled for the task, or other criteria). As such, in these embodiments, the computer 110 is programmed to perform the exception analysis for these essential or prioritized tasks to ensure that the currently scheduled task does not render them impossible to execute and handles such an occurrence as discussed above.

Having scheduled the task along with the corresponding device(s), personnel, location, etc., for the task at step 240, the computer 110 is programmed to, at a designated "check-in" time prior to the task indicated by a check-in time attribute for each device in the scheduled task, check on the viability of one or more of the device(s) scheduled for the task.

The check-in time attribute includes a check-in time attribute value that triggers the check-in process such that the computer 110 checks in on the viability of one or more devices scheduled for a task at a designated time prior to the scheduled start of the task. Thus, the check-in time attribute value can be a date/time value, a value of a time prior to the scheduled start time, or other temporal indication.

In various embodiments, a task can have only one or multiple check-in times, such as one or more days prior to the date of the scheduled task, at the start of the day of the scheduled task (e.g., at 12:00 AM or other time indicating the start of the day), 4 hours before the start time of a task, 2 hours before the start time of a task, 1 hour before the start time of the task, or in other increments of time prior to the scheduled start of the task. In various embodiments, the check-in time attribute value is the start time of one or more tasks immediately prior to the scheduled task. The check-in time attributes values are, In various embodiments, a priori set by default for each device.

Figure 3:
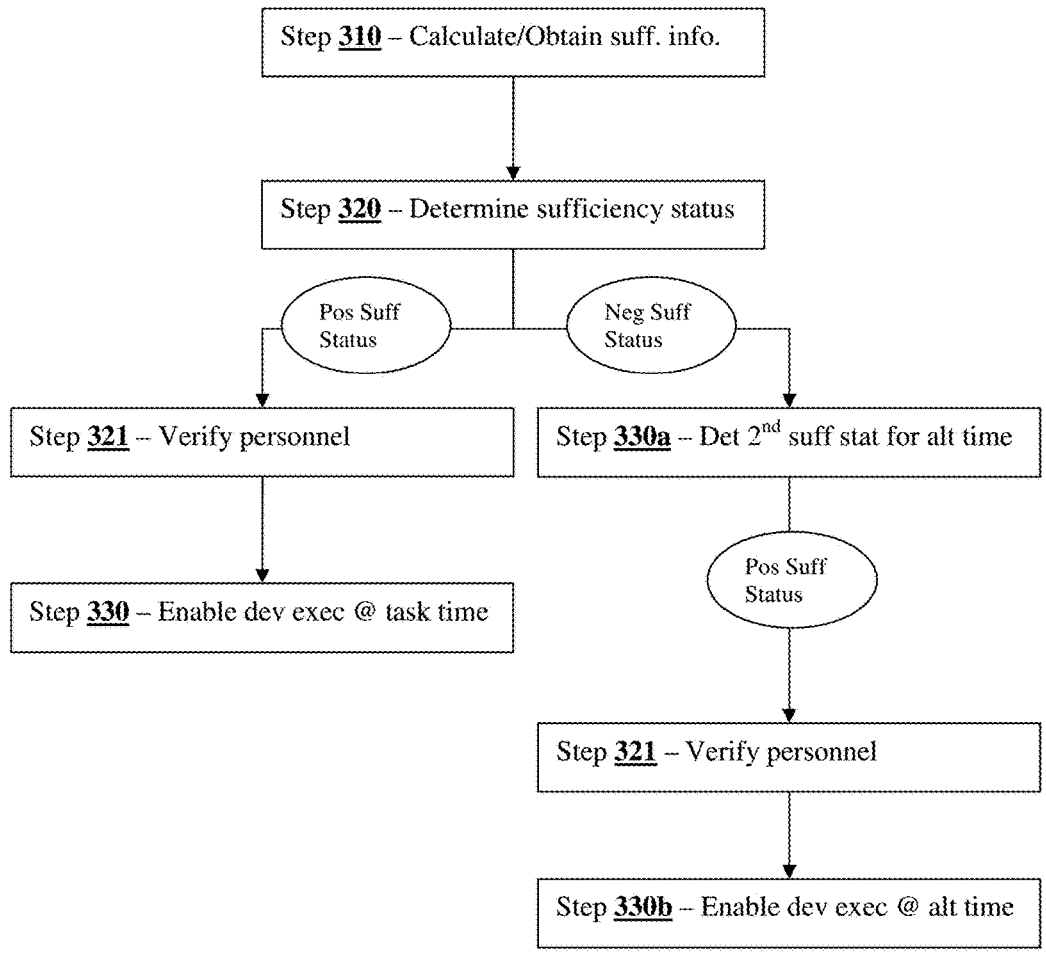
FIG. 3 provides an illustrative flowchart overview of the check-in process executed by the computer, according to embodiments of the inventive subject matter.

FIG. 3 provides an illustrative example of the check-in process, according to embodiments of the inventive subject matter.

At step 310, the computer 110 calculates sufficiency information related to a device assigned to the task. The sufficiency information is the current, up-to-date sufficiency information of the particular device. To calculate the sufficiency information for a device, the computer 110 obtains the current device attribute values (from the device database 130 or from pinging the device 120 itself for an updated status for devices capable of this communication) at the check-in time and, based on the scheduled tasks between the check-in time and the scheduled task start time, calculates an updated anticipated device readiness attribute values for the device 120, via the processes utilized at step 220. The sufficiency information is thus the updated anticipated device readiness attribute values.

At step 320, the computer 110 determines a sufficiency status of the device for the task during the scheduled time period of the task by comparing the sufficiency information determined at step 310 with the device minimum readiness attributes for the task. In various embodiments, the computer 110 determines either a positive sufficiency status (if the sufficiency information continues to meet or exceed the device minimum readiness attributes for the task) or a negative sufficiency status (if the sufficiency information now fails to meet or exceed the device minimum readiness attributes for the task).

In various embodiments, the computer 110 verifies the availability of one or more of the personnel assigned to the task for the task at the scheduled task time at step 321, in response to the determination of a positive sufficiency status for the device. In some embodiments, the personnel verified can be those that are directly linked to the verified device (e.g., operators or technicians necessary for the operation of the device for the task). In other embodiments, the personnel verified can also include other personnel associated with the task (such as the "critical" personnel for the task), even if they are not directly related to the verified device itself.

Having determined a positive sufficiency status, the computer 110 proceeds to step 330 where, at the scheduled time period of the task, the computer 110 communicates with the device to enable the execution (via an execution message) of one or more functions of the device 120. If multiple check-in times are used, the computer 110 communicates with the device 120 at step 330 following a determination of a positive sufficiency status at the check-in time closest to the scheduled start time of the task.

The execution message that enables the execution of the function(s) of device 120 can be in the form of an unlock message that allows personnel to access the function(s) of the device 120, an activation message that causes the function(s) of the device to activate, or an authentication message including login credentials previously supplied to the device 120 via a confirmation message. This execution message can include new, updated, or additional executable use restrictions that are executed by the device 120 as discussed herein to restrict the functions and outputs of the device accordingly.

If, at step 320, the computer 110 determines a negative sufficiency status, the computer 110 is programmed to determine a second sufficiency status at step 330a for the device for an alternative time period, and to repeatedly select alternative time periods for the task until one is found that results in a positive sufficiency status for the device 120. After one is found, alternative sufficiency status for other device(s) scheduled to the task are calculated and verification for the corresponding personnel is performed and, if the positive sufficiency status results for the alternative time period is returned for the other devices and the availability of personnel for the alternative time period is confirmed, the computer 110 reschedules the task to the alternative time period. At the start time of the alternative time period (or, In various embodiments, a pre-set time prior to the start time; e.g., 10 minutes, 30 minutes or other interval), the computer 110 sends the execution message to the device 120 to enable the execution of the device's functions for the task at step 330b.

In various embodiments, the check-in time can be adjusted from the default based on how close the values of one or more of the anticipated device readiness attributes calculated at step 222 are to their respective device minimum readiness attribute value(s) for a task. For example, the computer 110 determines that an anticipated device readiness attribute value falls within a threshold percentage of its respective device minimum readiness attribute value, the computer 110 is programmed to adjust the check-in time attribute value such that the time between the check-in and the start time of the scheduled task is increased by a percentage of the time between the check-in time and the start time of the scheduled task (e.g., doubled, increased by 50%, etc.). Thus, the computer 110 can, for a situation where the anticipated readiness of a device for a task is already fairly close to the minimum requirements, mitigate the greater risk that usage of a device beyond the expected use in tasks prior to the scheduled task will render the device unsuitable for the task by checking in with the device with increased time. Additionally and/or alternatively, the computer 110 can, based on the anticipated device readiness attribute value(s) falling within the threshold, increase the number of check-in times such that the computer 110 checks in with the device 120 more frequently prior to the start of the scheduled task.

Similarly, the adjustment of the check-in time can be based on the distance between the location of the task immediately prior to the start of the scheduled task and the location of the scheduled task. For example, if a check-in time is 10 minutes prior and the location of the task scheduled immediately prior to a scheduled task is such that the travel time is expected to be greater or equal to 10 minutes, the computer 110 is programmed to adjust the check-in time to account for the travel time and a buffer by increasing the check-in time by a percentage of the travel time (e.g., twice the travel time, 3× the travel time, 50% more than the travel time, etc.). Thus, the check-in time can be adjusted based on a real-world location.

In various embodiments, the check-in time can be adjusted based on a virtual location of the device (e.g., a network location). For example, if a device 120 is on a network such that the network location of the device will increase the communication time due to other networking factors, the check-in time can be increased accordingly. In another example, if a device 120 is expected to be in an environment where data communication is more likely to be disrupted or outright unavailable, the computer 110 can adjust the check-in time to check in with the device before and/or after the device leaves this environment.

In various embodiments where multiple check-in times are used, the computer 110 can be programmed to adjust subsequent check-in times based on the sufficiency information received at a check-in, by applying the sufficiency information in the same way that the check-in time can be adjusted via the anticipated readiness attributes at the time of the scheduling of the task. As such, the subsequent check-in times (and, in certain various embodiments, addition of additional check-in times) can be adjusted based on updated actual information associated with the device 120.

In various embodiments, the check-in time can be adjusted based on factors such as the availability of alternative devices for a task. In these embodiments, the computer 110 adjusts the travel time as follows:

In these embodiments, the computer 110 matches, at step 221, more than one device 120 to the task attributes in the same manner as discussed above, and calculates the suitability for these additional devices 120 for the scheduled task via the process of steps 222-223. Thus, the computer 110 selects backup devices 120 in addition to the device 120 ultimately scheduled for the task.

If a threshold amount of backup devices are met or exceeded, the computer 110 does not adjust the check-in time attribute value. If the threshold amount is not met, the computer 110 is programmed to adjust the check-in time for the selected device by increasing the check-in time. The adjustment can be inversely proportional to the amount of backup devices available up to a maximum amount of adjustment (if no backups are found). Thus, as alternatives lack, the computer 110 increases the check-in time with the selected device 120 to verify the continued suitability of the selected device further ahead of the scheduled startup time. Alternatively and/or additionally, the amount of check-in times can be increased to add additional check in times based on the amount of backup devices. Thus, if the number of backups meets the threshold, the computer does not add additional check in times. As the number of backups decreases, additional check-in times are added such that the computer 110 checks in with the selected device 120 more frequently as the start time of the task approaches.

In a variation of these embodiments, the attributes of the alternatives used to adjust the check-in time include the location of the alternative devices based on the location of the tasks using these devices scheduled most immediately prior to the start time of the scheduled task. Thus, if one or more of the alternative devices are anticipated to be at a location such that the distance to the location of the scheduled task indicates a travel time that is longer than the default check-in time, the computer 110 increases the check-in time for the task to match or exceed the travel time for one or more of the alternative devices. It should be noted that, In various embodiments, the computer 110 can programmed to perform this adjustment even if the anticipated travel time for the device 120 actually selected for the scheduled task from its expected previous location does not exceed the check-in time.

In various embodiments, the computer 110 is programmed to adjust the check-in time based on the virtual or network location of one or more of the alternative devices, similarly to how the computer 110 checks in with the selected device 120 based on a virtual or network location as discussed above.

In these embodiments, the computer 110 checks-in with the selected device 120 as discussed above and can similarly check-in with the alternative devices at each check-in time and, as discussed above, calculate sufficiency information and determine device sufficiency for each alternative device. Based on the calculated sufficiency information of one or more of the alternative devices, the computer 110 is programmed to adjust subsequent check-in times and/or add additional check-in times.

In other embodiments, the computer 110 first checks in with the selected device 120 and, based upon a determination of a negative sufficiency status at step 320, then performs the sufficiency status check for the selected alternative machines and, based on a positive sufficiency status for an alternative device, schedules the alternative device for the task.

In other embodiments, the computer 110 does not select the alternative devices at the time of device creation. Instead, at the check-in time and upon a determination that the selected device 120 has a negative sufficiency status, the computer 110 then selects one or more alternatives based on the device attributes and task attributes, and for those alternative devices, calculates a sufficiency information based on the current values of the attributes and determines a sufficiency status for the alternative device(s) until an alternative device is found having a positive sufficiency value. The computer 110 then schedules the selected alternative device to the task.

In various embodiments, the use restrictions discussed above generated by the computer 110 are based on one or more subsequent tasks scheduled for the device 120. Thus, if any exceptions for subsequent tasks are found as discussed above, the computer 110 determines whether an optimization of functions of device 120 is possible in the current task and one or more subsequent tasks to attempt to resolve the exception. To do so, the computer 110 performs a process whereby it obtains the expected use attribute values for the device 120 for the task scheduled at step 240, and performs a hypothetical calculation by adjusting the expected use attributes of the device 120 for the scheduled task at step 240 by reducing one or more of the device attributes associated with a depletion during function (e.g., output level, power consumption, etc.) to the minimum acceptable levels. The computer 110 then calculates the adjusted anticipated device readiness attribute values for the subsequently-occurring (but previously-scheduled) tasks and determines whether they meet the minimum requirements for those tasks as discussed above. If so, the computer 110 can include use restrictions in the confirmation message for the task scheduled at step 240 restricting the use of the device to the minimum levels for the task, to ensure the device 120 will be usable for subsequent tasks. In various embodiments, if the minimum acceptable levels result in resolving the conflict, the computer 110 can systematically increase the expected use levels of the device 120 until the requirements for the subsequent tasks are no longer met, and then applying the use restrictions to the last theoretical expected use setting such that the available resources of the device 120 for the task being scheduled at step 240 are maximized while still allowing for the device 120 to remain suitable for the subsequently-occurring tasks in the schedule.

In various embodiments, the exception-handling processes are executed by the computer 110 for all scheduled tasks whenever a new task is added to the schedule. In these embodiments, the computer 110 sends additional confirmation messages to devices 120, including updated use restrictions to as necessary to accommodate additionally-scheduled uses. These additional confirmation messages can be provided to devices 120 on a push basis as new tasks are scheduled and/or at the time of check-in along with the check-in messages sent by computer 110.

In the embodiments discussed above, the device(s) 120 are assumed to be capable of communication with the computer 110 via networking components via communication methods that may be wired or wireless, long- and/or short-range, and device-to-device or via networking devices such as routers, etc. Examples of these types of communications include, but are not limited to, USB, HDMI, WiFi, cellular, near-field communication, Bluetooth, RFID, etc.

Thus, in these embodiments, the devices 120 are able to receive information from the computer 110 and send information back to computer 110.

However, in various embodiments, it is contemplated that certain devices 120a may not have full communication capabilities (i.e., may only be able to receive data but not send) or not have communication capabilities at all. These devices might be legacy devices that don't have communication and/or processing capabilities, or "simple" analog devices that traditionally may not have communication or processing functions (e.g., basic stethoscopes, tongue depressors, and other 'basic' hand-operated medical diagnostic or treatment tools). In various embodiments, the systems and methods of the inventive subject matter contemplates incorporating these "dumb" devices as well by communicating via a proxy.

In these embodiments, the computer 110 cannot check in with the dumb device directly because the device lacks the capability to automatically receive a request and respond in kind. Thus, the computer 110 checks in with a dumb device 120a based on the task location attribute of a current scheduled task for the device 120a or, if no task is scheduled, the device location attribute value of the device profile stored in the device database.

Figure 5:
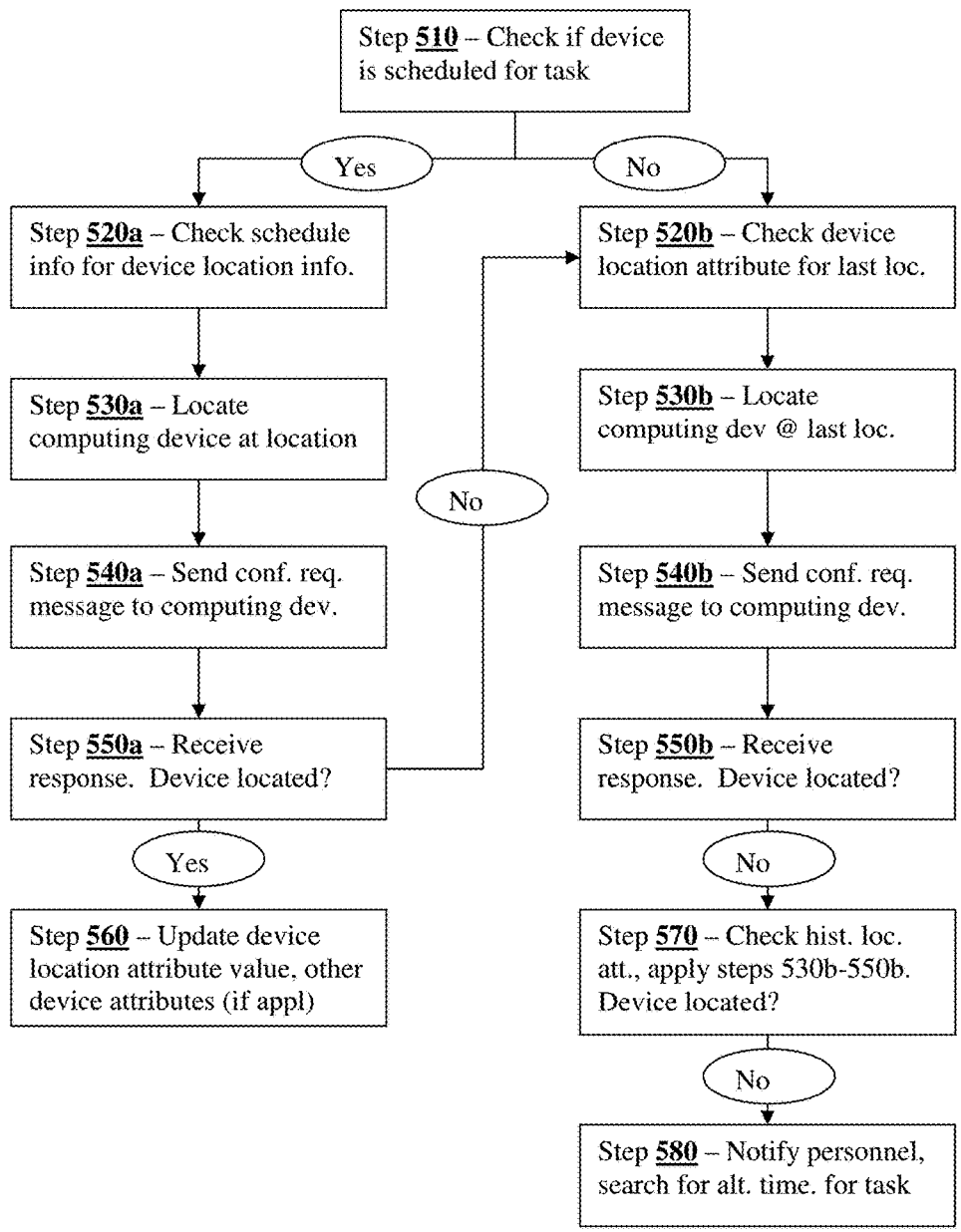
FIG. 5 provides an illustrative flowchart overview of the check-in process for unconnected devices executed by the computer, according to embodiments of the inventive subject matter.

The check-in process for "dumb" devices 120a is illustrated in FIG. 5. To check in with a dumb device 120a, the computer 110 first checks (at the check-in time) the schedule for the device 120a (either in the central calendar or the device profile 121 of the device 120a in the device database 130) at step 510 to ascertain whether it is currently scheduled to be in use for a scheduled task.

If a scheduled task exists that is using the device 120a ("yes" in FIG. 5), the computer 110 checks the task location attribute in the scheduled task entry of the calendar at step 520 to ascertain the location of the task at step 520a. In various embodiments, this information is also/instead found in the device schedule data in device profile 121 of device 120a, and is retrieved from there by computer 110.

The computer 110 then checks the location of the task for any computing devices having the ability to communicate directly with the computer 110 at step 530a, and identifies one or more of the computing devices at the location to which to send a confirmation request message. These may be other devices 120, or may be other devices such as computers, cellular phones, pagers, tablets, or other computing devices having communication capability at the location.

In various embodiments, the computer 110 has a priori knowledge of the location of certain "fixed" computing devices based on a network map correlated to physical locations such as within a facility, hospital, etc. These fixed computing devices are stationary within their physical locations and do not move.

In various embodiments where no fixed computing devices are located at the location, the computer 110 is programmed to locate mobile computing devices (e.g., tablets, cellular phones, laptop computers and other mobile computing devices) at the location based on location signals (e.g. GPS, etc.) reported by the devices to the computer 110, via a detection of wireless signals (e.g., accessing a wireless access point, etc), or via triangulation of cellular or other wireless signals.

Once the computer 110 has located a computing device (such as computing device 150 of FIG. 1) at the ascertained location 160 at step 530a, the computer 110 sends a confirmation request message to the computing device 150 at step 540a for presentation to the user of the computing device 150 at the location 160 (illustrated in FIG. 1 via the dashed arrow). The presentation can be a visual message to be displayed by a screen of the computing device, an audio message to be output via speakers or other audio output of the device, an audio prompt to view a visual message, etc. The confirmation request message is sent in the appropriate modality for presentation depending on the computing device 150, the output capabilities of the computing device 150 (e.g., screen, if available; speakers, if available), the operating system of the computing device 150, the application used to present the message (e.g., text message, email, a specific alert application on the device, etc.) and other device-specific requirements for the computing device 150 to output the request.

The confirmation request message includes a request that the user verify that the dumb device 120*a* is at the location 160, and a prompt for a reply by the user. The reply can be a typing of a simple "Y" or "Yes" or "N"/"No", or of a device ID number on the device on a keyboard or touch-screen input. The reply can be voiced into a microphone of the computing device. The response is then communicated back to the computer 110 and is received at step 550*a*. If the response indicates that the device 120*a* is at the location 160, the computer 110 updates the device location attribute 133*c* for the device 120*a* in device database 130 at step 560.

The confirmation request message can include a request for additional information such as supply information or charge information, as may be applicable for the device 120*a* and, based on the response, updates other device attributes 133 of the device profile 121 in device database 130 accordingly at step 560.

If the computing device 150 has a camera, the prompt can include instructions for the user to hold the device ID number or other identifier up to the camera to capture an image (i.e., still or video image data), which is then relayed back to the computer 110. Using OCR or other recognition technology, the computer 110 then verifies the device ID provided as corresponding to the device 120*a* and updates the location attribute of the device in device database 130.

In various embodiments, the device 120*a* can be affixed or imprinted with a barcode or other machine-readable indicia (e.g. QR code), which can be scanned and/or image-captured by the computing device (if it has a camera and/or scanner). The scanned information or image is transmitted to the computer 110 by the computing device, and the computer 110 verifies the information received as corresponding to the device 120*a*, and updates the location information for the device 120*a* in the device database accordingly.

If the computer 110 determines there is no currently scheduled task for the device 120*a* at the check-in time at step 510 ("no" in FIG. 5), the computer 110 then checks the device location attribute of the device 120*a* in device database 130 at step 520*b* to obtain the last-known location for the device. Having obtained the last-known location 160, the computer 110 then finds one or more computing devices at the location 160 at step 530*b* and sends a confirmation request message to one or more of the computing devices 150 at the location 160 at step 540*b* as described above with respect to steps 530*a*, 530*b*, respectively, and verifies a reply at step 550*b* as discussed above with respect to 550*a*. In various embodiments, the computer 110 can similarly check the device location attribute of the device 120*a* in the device database if, after querying the location of a currently-scheduled task that includes the device 120*a*, the response submitted via the computing device at the task location is such that the device 120*a* is not at the location of the current task as expected (illustrated via the "no" after step 550*a* flowing to step 520*b* in FIG. 5).

If the device 120*a* is not found, the computer 110 notifies the appropriate personnel at step 580, including the scheduler of the task for which the check-in is being performed. In various embodiments, the computer 110 proceeds to look for alternative time periods for the task as discussed above in response to failing to locate the device 120*a*.

In various embodiments, the device database 130 stores a historical record of past recorded locations for some or all devices 120*a* (and also devices 120). In these embodiments, if the device 120*a* is not located at either the location of its currently-scheduled task (if applicable) or last-known location, the computer 110 is programmed to obtain one or more of the historical locations at step 570 (preferably, starting with the most recent and working backward in time) and, for each of these historical locations, repeating the steps 530*b*-550*b* until the device is found. If the device 120*a* is not found after exhausting all of the historical locations stored in the device profile 121 for the device (or after a pre-determined set of attempts), the computer 110 executes step 580.

It is contemplated that the processes discussed with the dumb devices 120*a* can also be applied if a device 120 that has the appropriate communications and processing capabilities cannot be located or reached by the computer 110 at a check-in time (e.g., such as due to a power failure or running out of battery power, having been shut off by a user, a problem with the communications interface on the device 120, problem with the network preventing communication, etc.).

Thus, the systems and methods of the inventive subject matter enable the integration of unconnected devices into a networked device management and scheduling system, thus eliminating the limitations of prior scheduling systems that would not be able to handle these devices and required separate, manual management of same.

In various embodiments, the device attributes and task attributes referred to herein can be categorized as "unique attributes" and "non-unique attributes." As used herein "non-unique attributes" means attributes that can be shared by more than one resource. Examples of unique attributes could be, for example, a UID (Unique Identifier), a name, a social security number, a thumbprint, a serial number, or an address. Examples of non-unique attributes could be, for example, available time periods, preferred tasks that the person or the resource should be associated with, a non-unique corporate title, a skill, a skill level, a capability, preferred resources that a person should work with, preferred unique coworkers that a person should work with, a category of a resource, or a location of the resource. It is possible that an attribute could be unique in one context and non-unique in another context. For example, an employee address could be non-unique if there are two or more employees with the same address.

Examples of non-unique attributes for a task may include, but are not limited to, a person with a set of non-unique attributes, a resource with a set of non-unique attributes, a length of time, a subsequent task, and/or a preparatory task. Examples of non-unique attributes for a person may include, but are not limited to, a corporate title, a skill, a skill level, a capability, a resource preference, a task preference, a coworker preference, and/or an available time period. Examples of non-unique attributes for non-human resources (e.g., materials, consumable items, fixed equipment, mobile tools, rooms, buildings, computers, projectors, phones) may include, but are not limited to, quantity, quality, capability, availability, type, cost, location, and/or life cycle.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of controlling operation of a machine, comprising:
    determining, by a computer, availability and readiness of the machine for a task at a scheduled time, by consulting a scheduling program with respect to at least one of the machine's power state, supply state, resupply state, condition state and maintenance state, wherein the machine is selected from the group consisting of: general medical devices, specialized tools, environmental controls, medical scanning equipment, diagnostic equipment, patient monitoring equipment, surgical tools, patient beds, patient wheelchairs, computer equipment, anesthesia equipment, room environmental controls, and specialized medical devices;
    determining, by the computer, availability and readiness of a human operator to work with the machine to execute the task at the scheduled time, by sending a message to a device associated with the operator;
    determining, by the computer, a scheduled check-in time and a scheduled start time from multiple check-in times for the human operator and multiple start times for a scheduled task, wherein the scheduled check-in time and the scheduled start time is based on a number of available backup devices, locations of backup devices, and at least one operator factor;
    communicating, by the computer, the scheduled check-in time to the operator and the scheduled start time of the machine for the scheduled task;
    analyzing, by the computer, an effect of increasing a duration between the scheduled check-in time and the scheduled start-time relative to a subsequent task to determine a readiness threshold of the machine;
    determining, by the computer, whether the scheduled check-in time and the scheduled start time for the scheduled task exceeds the readiness threshold; and
    following a determination, by the computer, that the scheduled check-in time and the scheduled start time do not exceed the readiness threshold, increasing the duration between the scheduled check-in time and the scheduled start time; and
    unlocking, by the computer, the machine for use by the operator at the scheduled time by sending an unlock message to the machine at an updated start time, wherein unlocking the machine allows the operator to access one or more functions of the machine.

2. The method of claim 1, wherein the step of determining availability and readiness of the machine for a task comprises comparing attribute/value pairs for the machine with attribute/value pairs for the task.

3. The method of claim 2, wherein the attribute/value pairs for the task include a location attribute/value pair corresponding to a location of a corresponding prior task.

4. The method of claim 3, wherein the location attribute/value pair corresponds to a virtual location.

5. The method of claim 1, further comprising: determining a check-in time for use of the machine for the task at the scheduled time;
    determining availability and readiness of a second machine for the task; and then altering the check-in time for use of the first machine based on the availability and readiness of the second machine for the task.

6. The method of claim 1, further comprising: in the event that the first machine loses availability or readiness to execute the task at the scheduled time, then: determining availability and readiness of a second machine for the task at the scheduled time, by consulting the scheduling program with respect to at least one of the second machine's power state, supply state, resupply state, condition state and maintenance state; and unlocking the second machine for use by the operator at the scheduled time by sending a second unlock message to the second machine.

7. The method of claim 1, further comprising: in the event that the first machine loses availability or readiness to execute the task at the scheduled time, then in the event that no substitute machine is found to be available and ready to execute the task at the scheduled time, re-schedule the first machine to execute the task at a different time from the scheduled time.

8. The method of claim 1, further comprising using a computer to notify the operator that the task has been scheduled and that the operator is to assist in accomplishing the task at the scheduled time.

9. The method of claim 2, wherein at least first and second attributes of the attribute/value pairs of the machine include unique machine attributes and non-unique machine attributes.

10. The method of claim 2, wherein at least first and second attributes of the task attribute/value pairs of the task include unique task attributes and non-unique task attributes, respectively.

11. The method of claim 1, further comprising, upon determination that the first machine lost availability or readiness to execute the task at the scheduled time, electronically locking the machine to restrict the operator from using the machine at the scheduled time.

12. The method of claim 1, further comprising changing a functionality of the machine by restricting at least one of the machine's (a) operating capacity and (b) total output, based upon a change in a task requirement for the machine.

* * * * *